3,342,688
NUCLEAR REACTOR CONTROL MECHANISMS
Ronald Scott Challender, Appleton, Warrington, England, assignor to United Kingdom Atomic Energy Authority, London, England
Filed Dec. 16, 1965, Ser. No. 514,326
Claims priority, application Great Britain, Dec. 30, 1964, 52,914/64
6 Claims. (Cl. 176—36)

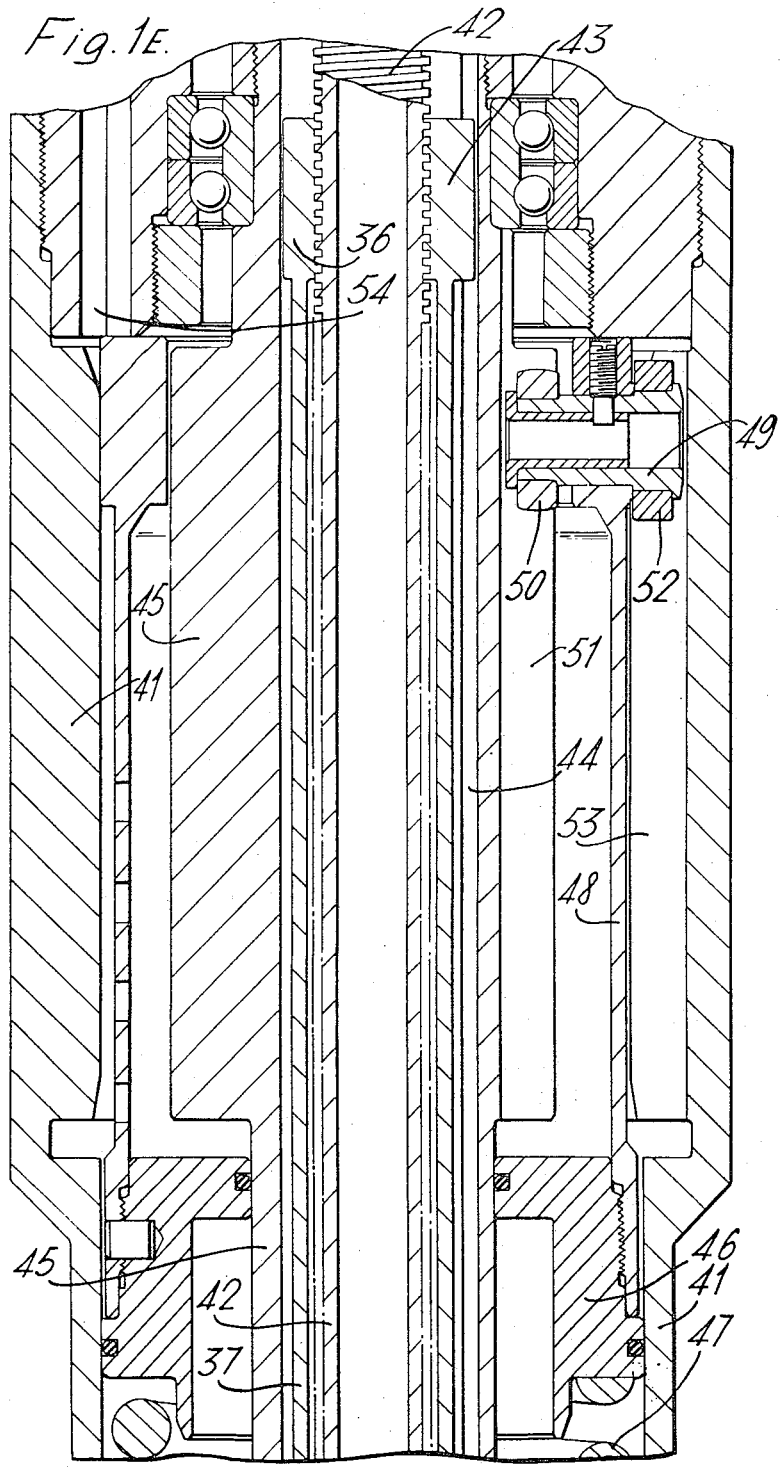

This invention relates to nuclear reactor control mechanisms.

Two forms of control are customarily provided in nuclear reactors, namely normal operational control and emergency control. Normal operational control involves slow movement of control rods relative to a reactor core, whereas emergency control calls for rapid movement of control rods in a direction to reduce reactivity of the core. Space and economic considerations make it advantageous in some reactor systems to provide one set of control rods to serve for both forms of control and to design control mechanisms so as to cater for the different speed requirements of the two forms. It is with this type of control mechanism that the present invention is concerned.

In one of its aspects, the present invention resides in a nuclear reactor control mechanism for normal control movement of a control rod relative to a reactor core and releasable to allow for rapid movement of the rod in a direction to reduce reactivity of the core, the mechanism comprising a drive member engaging, on one side of a gland, a driven member which extends through the gland, first means for restraining the driven member against rotation during normal control movement, a releasable mechanical coupling between the driven member and a control rod carrier on the other side of the gland, and second means for effecting limited rotation of the driven member to release the coupling so as to allow for rapid movement of the carrier in the direction to reduce reactivity of the core.

In another of its aspects the present invention resides in a nuclear reactor control mechanism for normal control movement of a control rod relative to a reactor core and releasable to allow for rapid movement of the rod in a direction to reduce reactivity of the core, the mechanism comprising a nut member and a screw member in engagement on one side of a gland through which one of the members extends, a control rod carrier on the other side of the gland, a releasable mechanical coupling between the carrier and the member extending through the gland, restraint means for restraining the member extending through the gland against rotation during normal control movement, and drive means for effecting limited rotation of the member extending through the gland to release the coupling so as to allow for rapid movement of the carrier in the direction to reduce reactivity of the core.

Figure 1A:
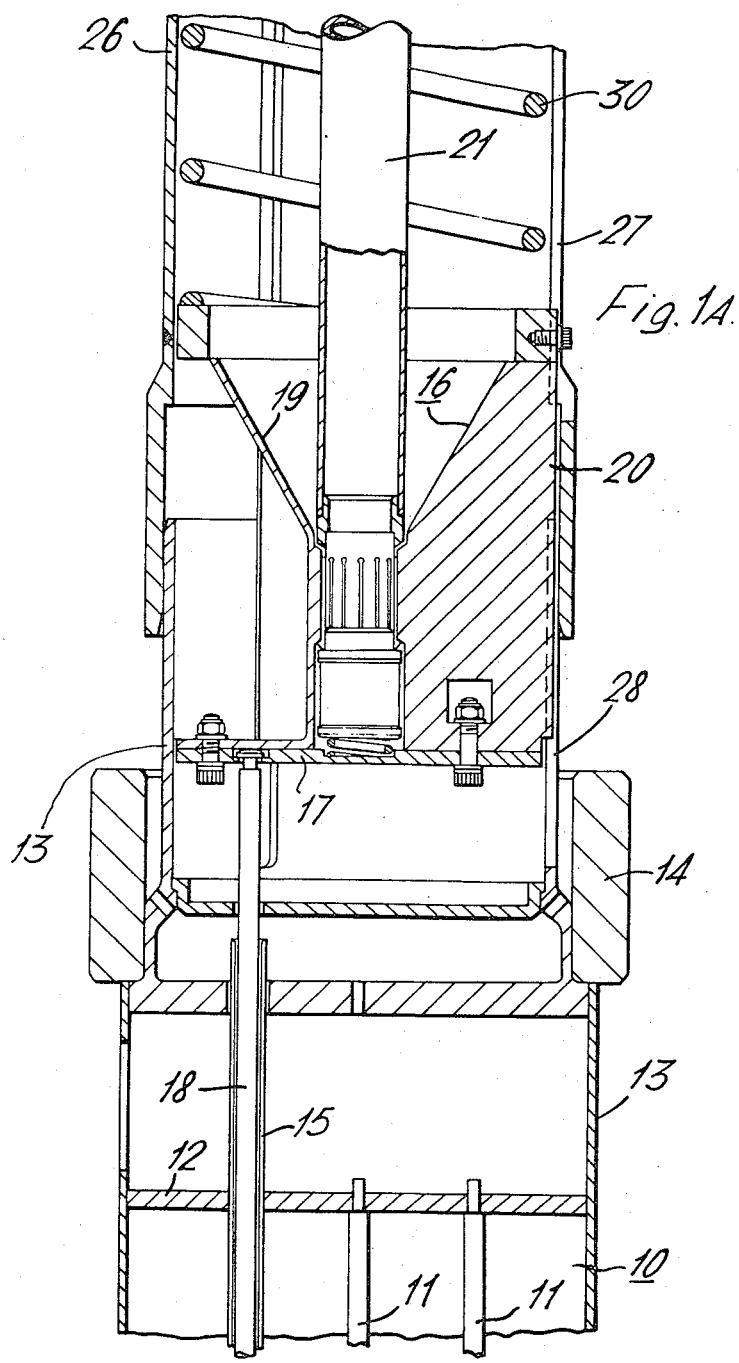
Figure 1B:
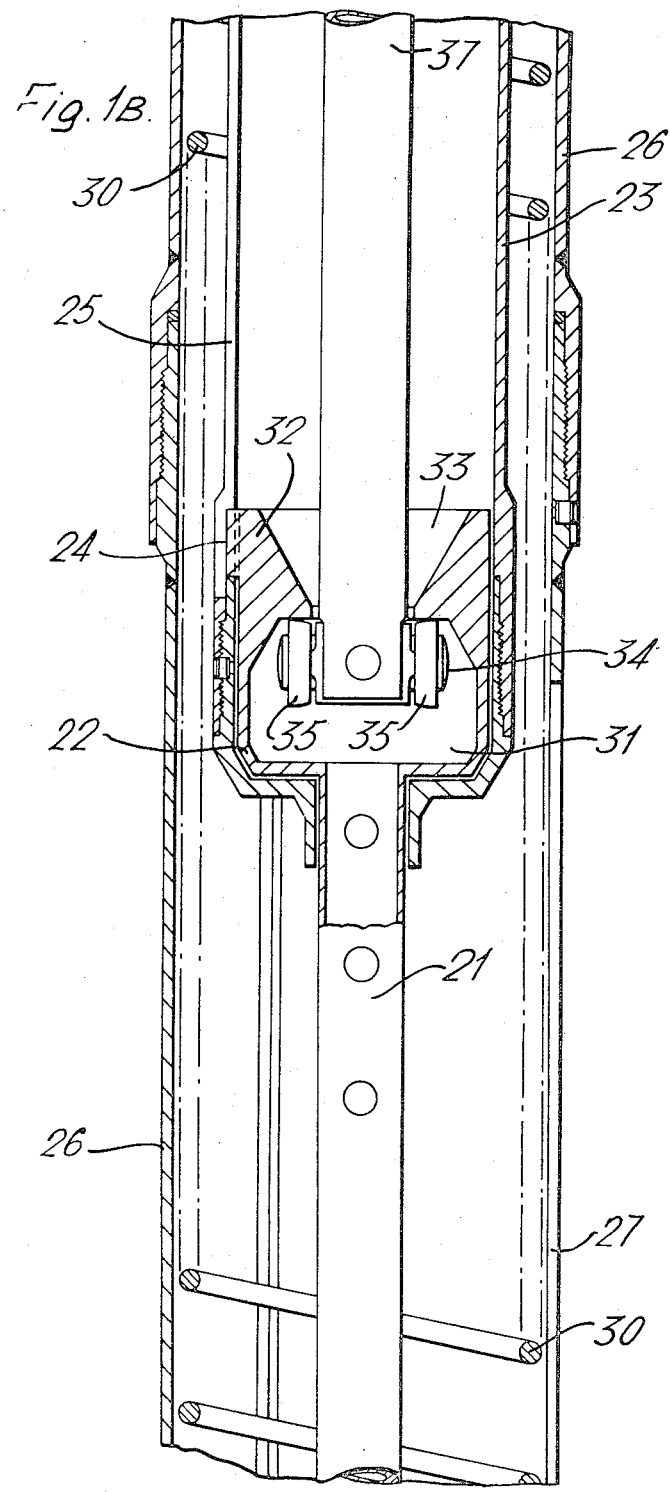
Figure 1C:
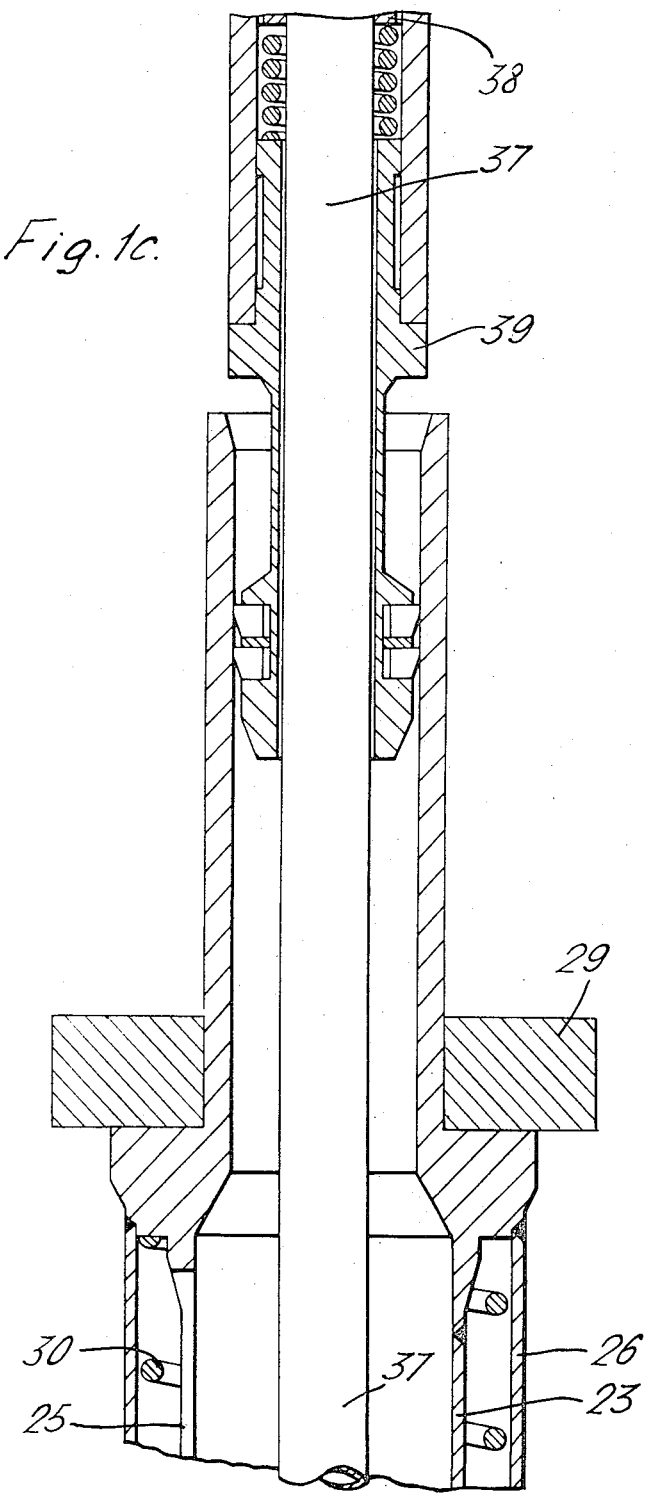
Figure 1D:
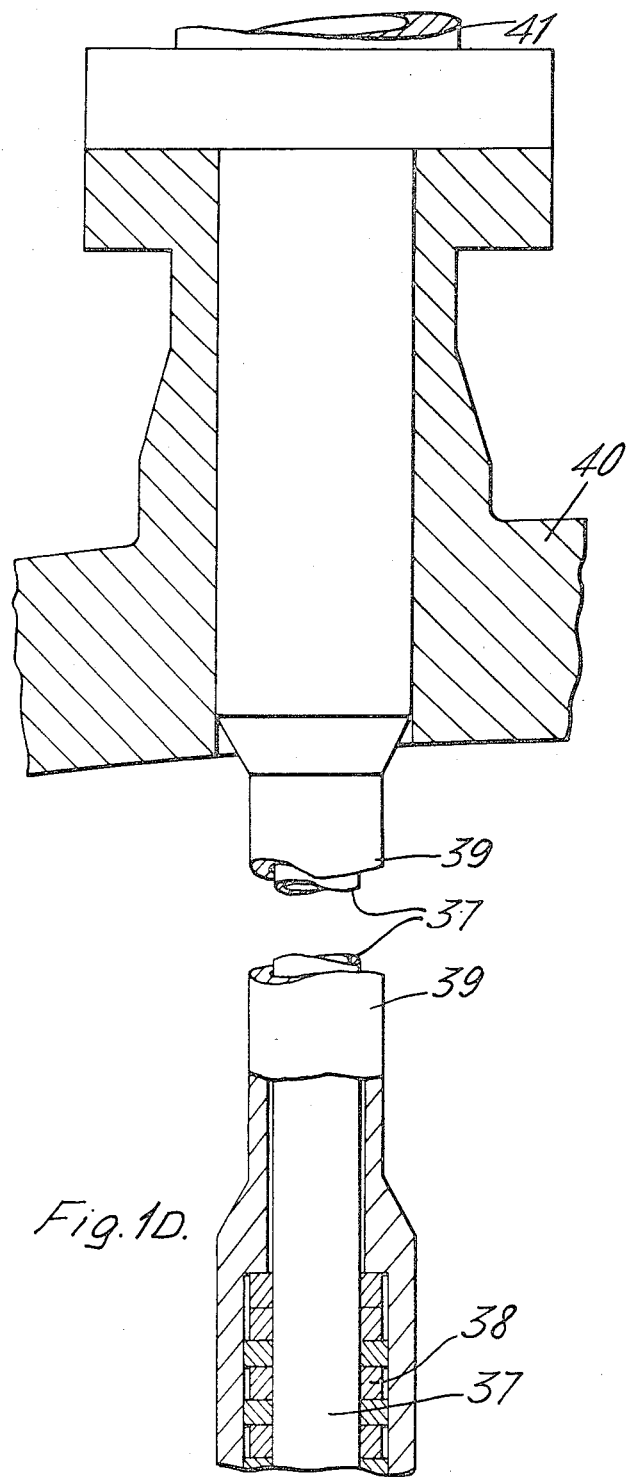

In the accompanying exemplifying drawings FIGURES 1A to 1E show in sectional elevation five successive portions from a lower to an upper end region of one embodiment of nuclear reactor control mechanism in accordance with the invention, the scale of FIGURE 1E differing from that of FIGURES 1A to 1D.

The invention is described below by way of example with reference to a pressurised water reactor having a reactor core comprising a number of similar fuel element assemblies, each such assembly having an associated control mechanism. As shown in the drawings, each fuel assembly 10 comprises a number of upright fuel pins 11, typically of uranium oxide in stainless steel sheaths, fixed in position between spacer plates (one of which is shown and designated 12) supported in a tubular fuel element shroud 13 located between an upper core support grid 14 and a lower core support grid house in a reactor pressure vessel. Disposed symmetrically within the shroud 13 are a number of upright guide tubes 15.

The associated control mechanism comprises a control rod carrier 16 disposed above the fuel pins 11 and guide tubes 15, the carrier 16 having a plate 17 supporting a control rod formed by a number of upright control pins 18, typically of neutron absorber material such as boron steel, which are flexibly linked to the plate 17 and extend into the guide tubes 15. To the plate 17 a part-conical tube 19 is connected by bolts, the tube 19 having three equi-spaced radially disposed plates effectively forming keys 20, and to the tube 19 is coupled the lower end of a tubular member 21 of the carrier, the upper end 22 of the tubular member 21 being enlarged to serve as a damping piston movable axially in a coaxial damping tube 23, the piston having a key 24 engaging in a longitudinal keyway 25 in the inner wall of the damping tube 23. Disposed round the tubular member 21 of the carrier and the damping tube 23 is a coaxial main tube 26 of the control mechanism, this main tube 26 being keyed at its lower end to the upper end of the fuel element shroud, the keys 20 engaging keyways 27, 28 in the tube 26 and shroud 13 respectively. The upper ends of the damping tube 23 and the main tube 26 are located by a control mechanism support grid 29 carried from the reactor vessel. Disposed coaxially in the annulus between the main tube 26 and the damping tube 23 and tubular member 21 is a main helical scram spring 30 effectively extending between the control mechanism support grid 29 and the carrier 16. The enlarged end 22 of the tubular member 21 serving as a damping piston is shaped to form one part of a releasable mechanical coupling, this part having a wall defining a circular socket 31 with upper flanges 32 defining a diametral slot 33 giving access to the socket. The other part of the releasable mechanical coupling is formed by a hammerhead, or in other words a transverse shaft 34, on the lower end of a driven member, and for engagement of the coupling the hammerhead is inserted through the diametral slot and rotated through 90° for rollers 35 on the shaft 34 to engage the underside of the flanges 32. The driven member is conveniently in the form of a nut member having a nut 36 and an integral nut extension tube 37 at the lower end of which the hammerhead is provided.

The nut extension tube 37 passes or extends through a gland (inside the reactor vessel) typically in the form of a multi-layer packing 38 located in a housing tube 39 coaxial with the main tube 26 and having sealing rings engaging internally the upper end of the tube 26 and effectively extending between the control mechanism support grid 29 and a lid 40 of the reactor pressure vessel, thus it follows that the releasable coupling is to or on the lower side of the gland. A port in the lid provides for passage of a portion of the housing tube into a main control mechanism body 41 outside the vessel and sealed to the vessel around the port. The nut extension tube 37 passes into the main body 41 by way of the housing tube, and the nut 36 at the upper end of the nut extension tube 37 engages a drive member in the form of a screw member 42 rotatably housed in the main housing body 41. Thus the nut and screw members engage on or to the upper side of the gland. The screw member 42 is rotated by way of a gear box and a drive motor at the upper end of the main body, and the nut has a key 43 engaging a longitudinal keyway 44 in a restraint member in the form of a rotatably (ball-bearing) mounted restraint tube 45 coaxially disposed in the main body around the nut extension tube 37. In the annulus between the restraint tube 45 and the main body 41 is an annular piston 46 and spring means in the form of an auxiliary helical spring 47 extending between a flange on the lower end of the main body 41 and the underside of the annular piston 46. On its upper side, the annular piston 46 carries by way of a connecting sleeve 48 a transverse restraint shaft 49. The inner end of the restraint shaft 49 has a roller 50 which engages a helical cam slot 51 (shown plain for clarity) formed in the outer surface of the upper end of the restraint tube 45, whilst the outer end of the restraint shaft 49 has a roller 52 which engages a longitudinal cam slot 53 formed in the inner wall of the main body 41. Thus the piston 46 in cam engagement with the restraint tube 45. Above the upper limit of travel of the annular piston 46 the main body 41 has an inlet 54 communicating with a source of pressurized fluid by way of a control valve.

During assembly with the auxiliary spring 47 in its relaxed state and the annular piston 46 at the upper limit of its travel, the hammerhead 34 is aligned to enter the diametral slot 33 giving access to the socket 31 in the upper end of the tubular member 21 of the control rod carrier. After assembly the control valve is opened to supply pressurised fluid to the interior of the main body 41 by way of the inlet 54 to move the annular piston 46 to its lower limit of travel and compress the auxiliary spring 47. This movement rotates the restraint tube 45 due to the engagement of the restraint shaft 49 carried by the piston 46 in the longitudinal slot 53 formed in the main body 41 and the helical cam slot 51 formed in the outer wall of the restraint tube 45, the cam slots being designed to give 90° of rotation over the length of travel of the piston 46. Since the nut 36 is keyed to the restraint tube 45, it follows that the nut 36 and nut extension tube 37 are also rotated through 90°, and similarly the hammerhead 34 is rotated through 90° to engage the coupling as described above.

During normal reactor operation the fluid pressure is maintained to keep the annular piston 46 at its lower limit of travel against the bias of the compressed auxiliary spring 47, so that normal operational control is effected by rotation of the screw member 42 which causes longitudinal or axial movement of the nut 36 and nut extension tube 37 since these are restrained against rotation by virtue of the arrangement of key 43 engaging keyway 44 and restraint shaft 49 engaging slots 51, 53. Thus the carrier 16 and the control pins 18 are moved relative to the fuel pins 11 of the core for normal operational control. For emergency control, the control valve is operated so that the fluid pressure above the piston 46 in the interior of the main body 41 is reduced and the annular piston 46 is rapidly moved by the auxiliary spring 47 to its upper limit of travel thus rotating the restraint tube 45, nut 36 and nut extension tube 37 through 90° and similarly rotating the hammerhead 34 to release the coupling. The carrier 16 is then free for rapid movement under the action of gravity and the normally compressed main spring 30 in a direction to reduce reactivity of the core, that is in a downward direction inserting the control pins 18 carried by the carrier 16 between the fuel pins 11. The damping piston and damping tube 23 serve to absorb the energy of movement at the end of the movement, that is to say with the control pins 18 fully inserted in the guide tubes 15 between the fuel pins 11 of the reactor core in a position of maximum control effect.

The arrangement whereby the nut is keyed to the restraint tube which is normally held against rotation by fluid pressure can be considered to constitute first or restraint means for restraining the driven member or member extending through the gland against rotation during normal control movement, whilst the arrangement whereby the restraint tube and its keyed nut is rotated through 90° by the auxiliary spring can be considered to constitute second or drive means for effecting limited rotation of the driven member or member extending through the gland to release the coupling.

The arrangement described above by way of example is advantageous in that it has flexibility in operation and in that the gland reduces contact between reactor coolant at high temperature and pressure and the engaging drive (screw) and driven (nut) members, and also in that it avoids the need for a rapid axial movement or stroke of the driven (nut) member through the gland for emergency control purposes which might otherwise lead to impairment of the sealing characteristics of the gland.

The invention is not limited to the details described above by way of example. For instance, the helical cam slots may be formed in the inner wall of the main body and the longitudinal slots formed in the outer surface of the restraint tube. Furthermore, more than one restraint shaft may be provided. The mechanism of the invention may be disposed for horizontal operation or alternatively may be positioned below the reactor core, instead of above the core as described in the above example.

I claim:

1. A nuclear reactor control mechanism for normal control movement of a control rod relative to a reactor core and releasable to allow for rapid movement of the rod in a direction to reduce reactivity of the core, the mechanism comprising a drive member engaging, on one side of a gland, a driven member which extends through the gland, first means for restraining the driven member against rotation during normal control movement, said first means comprising a restraint member keyed to the driven member and means for applying fluid pressure to hold the restraint member against rotation during normal control movement, said fluid pressure applying means having a piston in cam engagement with the restraint member, the piston being adapted to be held at one limit of its travel by the applied fluid pressure, a releasable mechanical coupling between the driven member and a control rod carrier on the other side of the gland, and second means for effecting limited rotation of the driven member to release the coupling so as to allow for rapid movement of the carrier in the direction to reduce reactivity of the core.

2. A nuclear reactor control mechanism as claimed in claim 1, wherein the second means comprises spring means for moving the piston to its second limit of travel to effect limited rotation of the restraint member.

3. A nuclear reactor control mechanism as claimed in claim 2, wherein the piston carries a restraint shaft engaging cam slots in the restraint member and a housing for the restraint member.

4. A nuclear reactor control mechanism as claimed in claim 3, wherein the drive member comprises a screw and the driven member comprises a nut engaging the screw and carrying a nut extension tube.

5. A nuclear reactor control mechanism as claimed in claim 4, wherein the restraint member is of tubular form coaxially disposed around the nut extension tube.

6. A nuclear reactor control mechanism for regulating the movement of a control rod relative to a reactor core at a normal control speed and also at a high speed in order to reduce reactivity for rapid shut down of a reactor, the mechanism comprising a housing, a drive member within the housing, a drive member which is axially displaceable at the normal control speed by means of the drive member and which is within and extends from the housing, a control rod carrier outside the housing, a twist-releasable mechanical coupling outside the housing, and positioned between and connecting the driven member and the control rod carrier for releasing the control rod carrier from the driven member so that it can move away from the driven member at the high speed, a first mechanical means within the housing for holding the driven member against rotation during normal operation, and a second mechanical means within the housing actuatable during reactor operation automatically in response to a signal to release the coupling by effecting a limited rotation of the driven member so that the control rod will act rapidly to shut down the reactor.

References Cited

UNITED STATES PATENTS

| | | | |
|---|---|---|---|
| 3,079,323 | 2/1963 | Hawke | 176—36 |
| 3,089,839 | 5/1963 | Hawke et al. | 176—36 |
| 3,158,545 | 11/1964 | Jones | 176—36 |
| 3,170,844 | 2/1965 | Nicoll | 176—36 |

CARL D. QUARFORTH, *Primary Examiner.*

L. DEWAYNE RUTLEDGE, *Examiner.*

H. E. BEHREND, *Assistant Examiner.*